United States Patent [19]

Greenfield et al.

[11] Patent Number: 5,114,228
[45] Date of Patent: May 19, 1992

[54] APPARATUS FOR MEASURING THE ENERGY OF RAPIDLY PULSING RADIATION

[75] Inventors: Ephraim Greenfield; Jacob J. Vecht, both of Jerusalem, Israel

[73] Assignee: Ophir-Aryt Optronics, Ltd., Jerusalem, Israel

[21] Appl. No.: 624,974

[22] Filed: Dec. 3, 1990

[30] Foreign Application Priority Data

Mar. 28, 1990 [IL] Israel ........................ 93918

[51] Int. Cl.⁵ .............................................. G01J 1/42
[52] U.S. Cl. ............................................... 356/222
[58] Field of Search ........................ 356/215, 218, 222; 374/32

[56] References Cited

U.S. PATENT DOCUMENTS

| | | |
|---|---|---|
| 3,344,703 | 10/1967 | Milton . |
| 3,464,267 | 9/1969 | Ehrlich et al. . |
| 3,535,523 | 10/1970 | Wunderman et al. . |
| 3,575,048 | 4/1971 | DeBenedictis . |
| 3,687,558 | 8/1972 | Rex . |
| 4,019,381 | 4/1977 | Elmer . |
| 4,035,088 | 7/1977 | Jenkins et al. . |
| 4,037,470 | 7/1977 | Mock et al. . |
| 4,130,363 | 12/1978 | Graham . |
| 4,187,026 | 2/1980 | Schaffer et al. . |
| 4,321,824 | 3/1982 | Martin . |
| 4,330,761 | 5/1982 | Cohn et al. ............... 372/4 |
| 4,381,148 | 4/1983 | Ulrich et al. . |
| 4,413,916 | 11/1983 | Seguin . |
| 4,431,306 | 2/1984 | Estey et al. . |
| 4,522,511 | 6/1985 | Zimmerer . |
| 4,596,461 | 6/1986 | DeRosa et al. . |
| 4,728,188 | 3/1988 | Kitagawa et al. . |
| 4,737,643 | 4/1988 | Roberts et al. . |
| 4,765,749 | 8/1988 | Bourgade et al. . |
| 4,797,555 | 1/1989 | LaMar . |
| 4,828,384 | 5/1989 | Plankenhorn et al. . |
| 4,842,404 | 6/1989 | Duda . |

OTHER PUBLICATIONS

Honda et al., "Measurements of Picosecond Laser Pulses from Mode-Locked Nd:YAG Laser", Conference on Precision Electromagnetic Measurements, Boulder, Colo. (Jun. 28-Jul. 1, 1976) pp. 33-34.

Edwards et al., "A standard calorimeter of pulsed lasers" *Journal of Physics E: Scientific Instruments* vol. 8 (1975) pp. 663-665.

*Primary Examiner*—Richard A. Rosenberger

[57] ABSTRACT

Apparatus for determining the energy of single pulses of rapidly pulsing laser radiation including first radiation sensing apparatus for providing a first signal output in response to single pulses of a plurality of pulses of rapidly pulsing radiation; second radiation sensing apparatus for providing a second signal output in response to a plurality of pulses of rapidly pulsing radiation, the second signal output being an indication of the overall average incident optical power of the plurality of pulses; and signal processing apparatus, associated with the first and second radiation sensing apparatus, for receiving and processing the first and second signal outputs so as to determine an average pulse rate of the plurality of pulses and thereby also to provide an output indication of the energy of single pulses of the plurality of pulses of rapidly pulsing radiation.

20 Claims, 8 Drawing Sheets

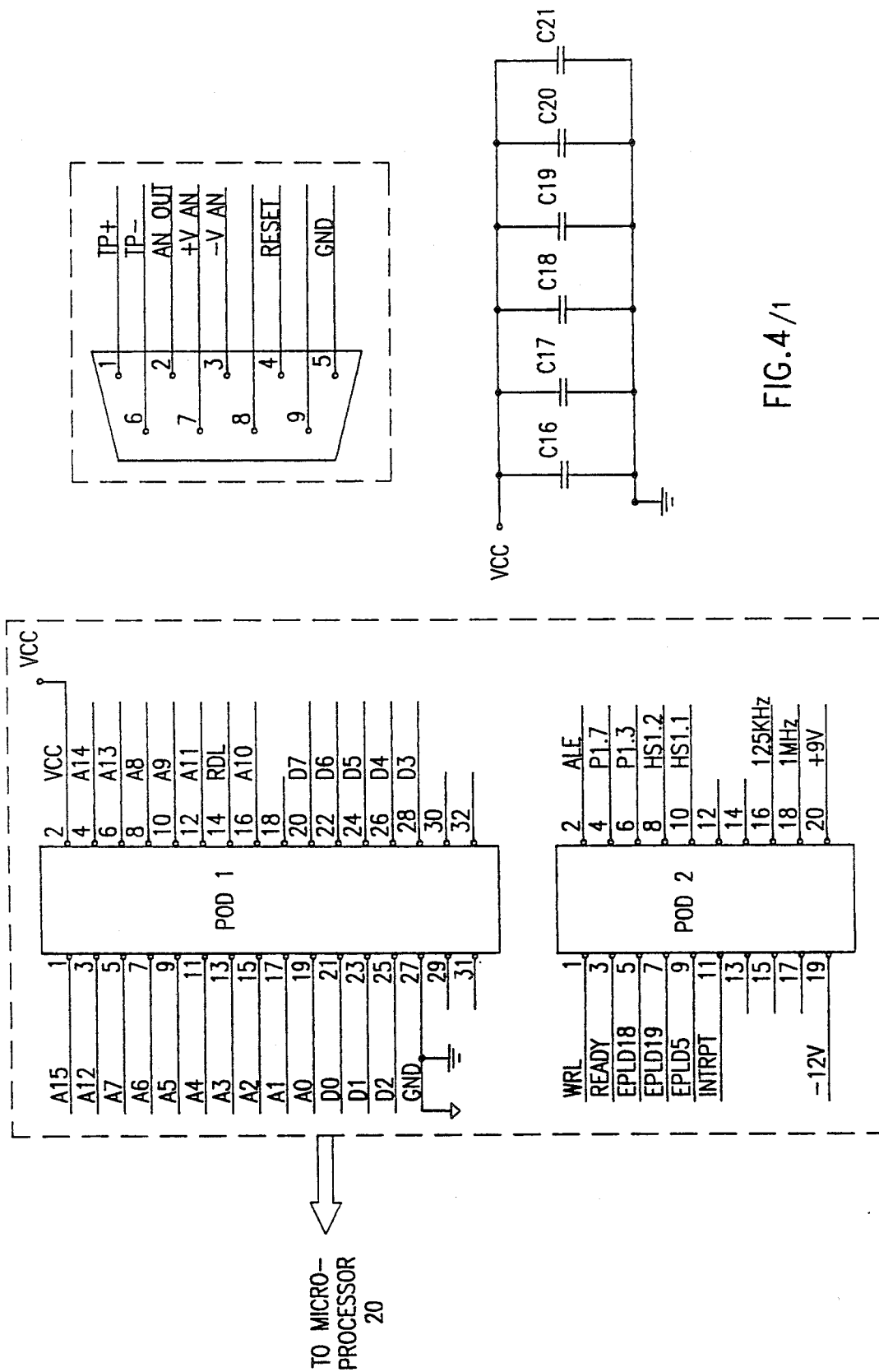
FIG.4/1

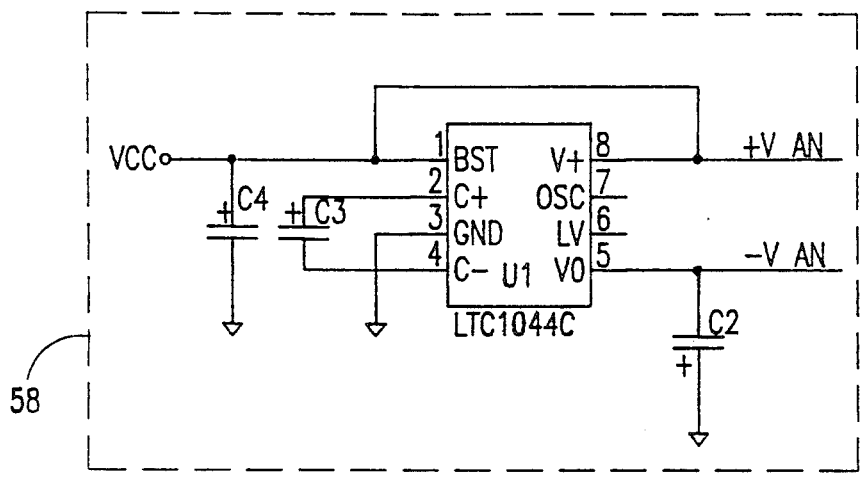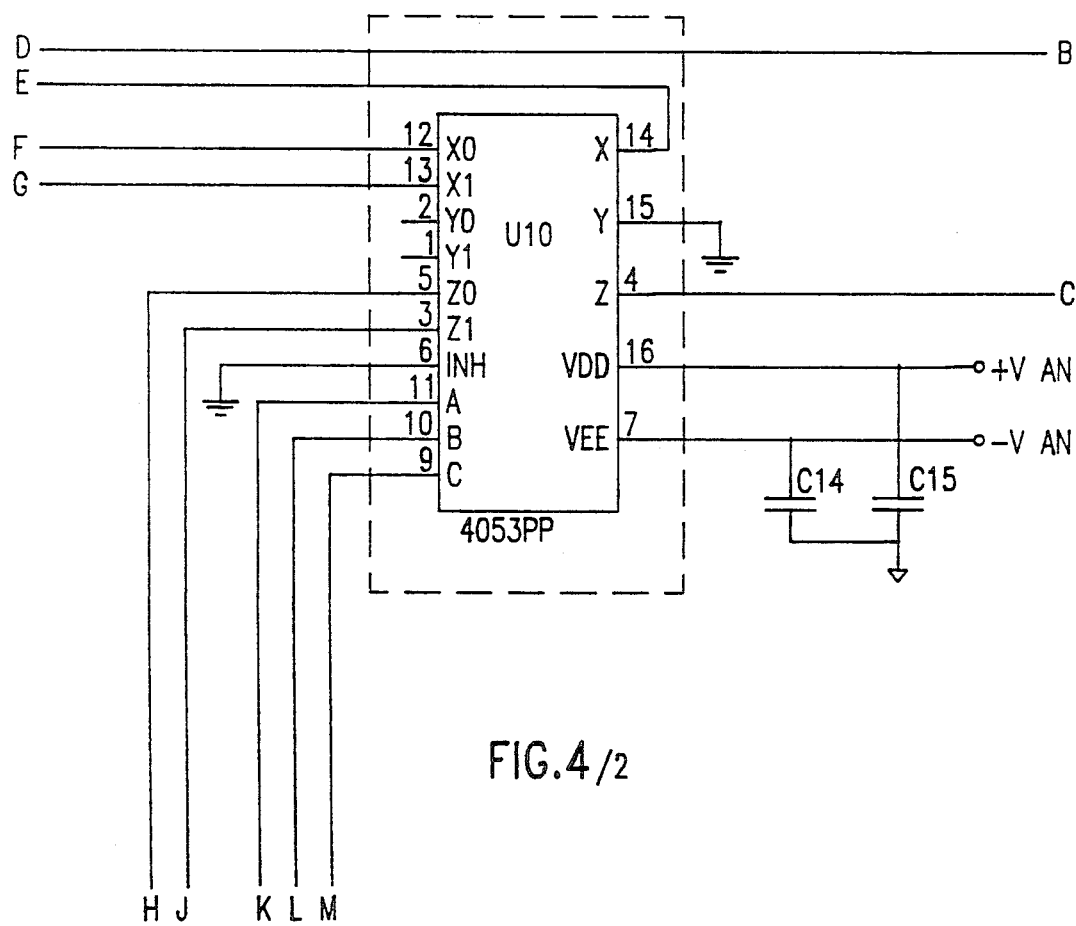
FIG.4/2

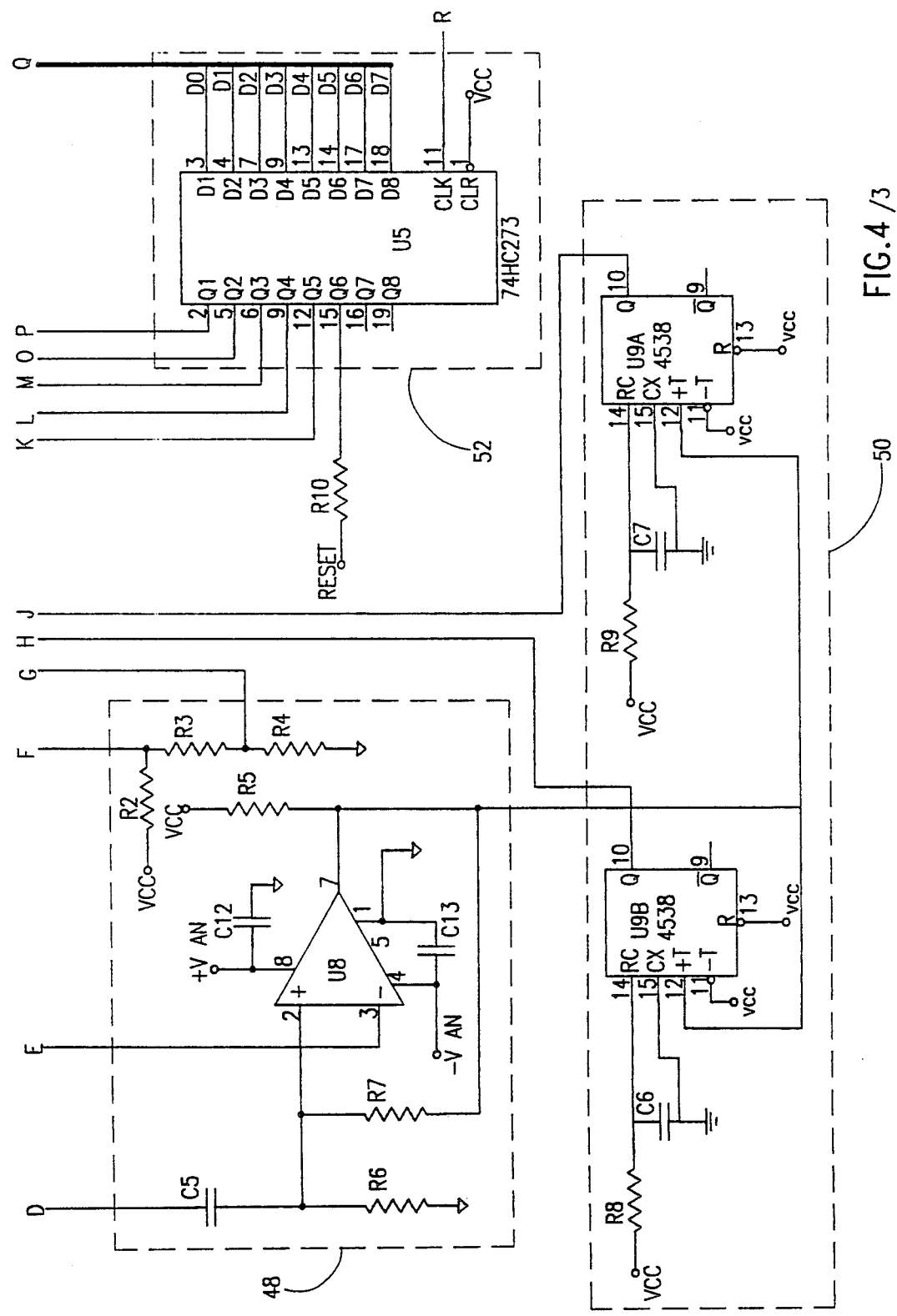
FIG.4/3

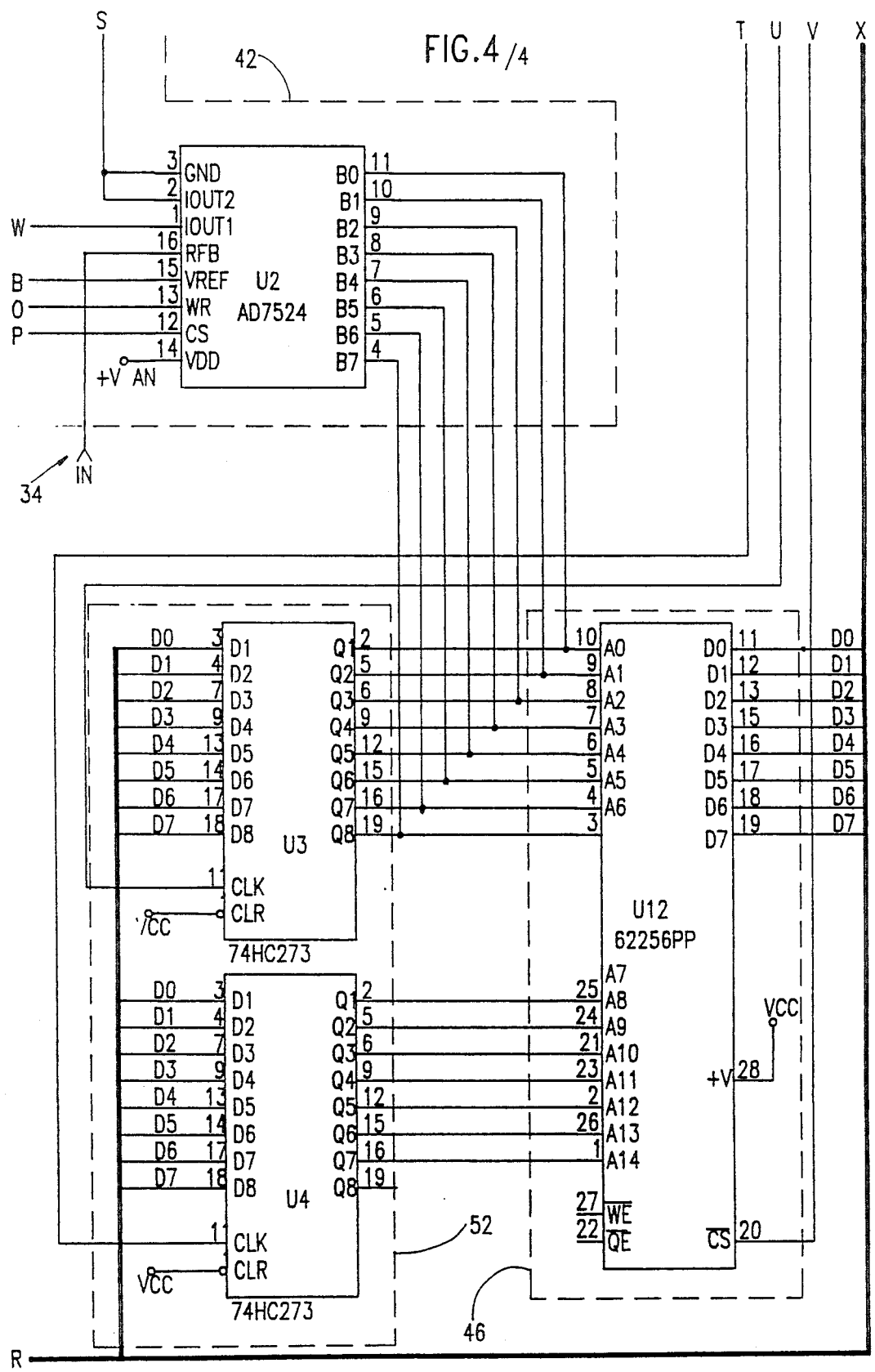
FIG.4 /4

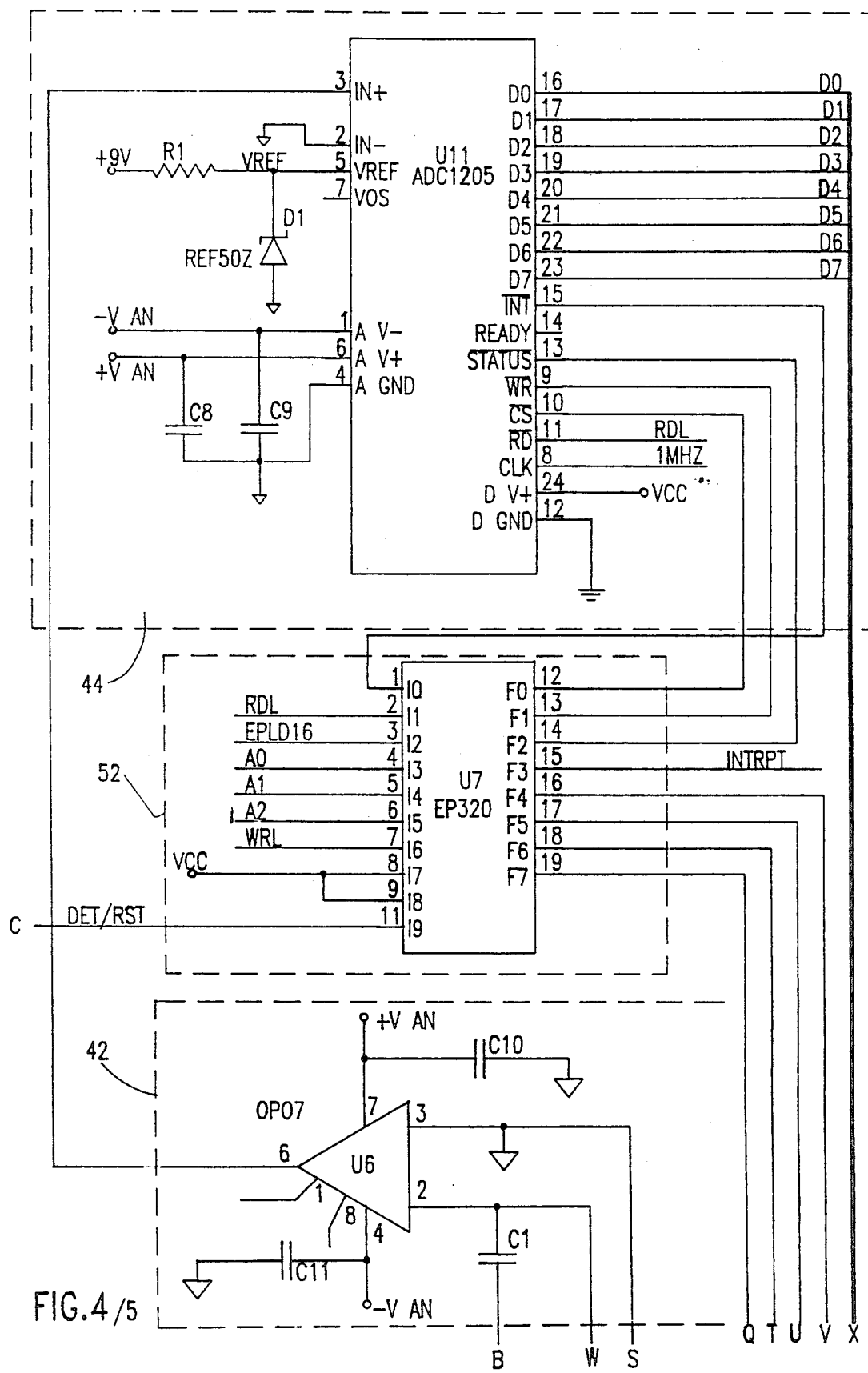
FIG.4/5

APPARATUS FOR MEASURING THE ENERGY OF RAPIDLY PULSING RADIATION

FIELD OF THE INVENTION

The present invention relates to apparatus for measuring the energy of rapidly pulsing radiation.

BACKGROUND OF THE INVENTION

Conventional laser energy detectors are typically thermal, pyroelectric or photodiode based.

Thermal type laser energy meters are accurate but can only measure laser pulses approximately every 5 seconds, because of their inherent slow response. They are unsuitable, therefore, for measuring pulsing laser radiation having a pulse rate faster than one pulse every 5 seconds.

Pyroelectric detectors can measure pulses that occur at a much more rapid rate, but, as known in the art, are generally inaccurate, typically having an accuracy of about ±5%. In addition, they do not have absolute calibration, nor can they be used for high energy density pulses. A further disadvantage of pyroelectric detectors is that they are also sensitive to humidity and to microphonics.

Photodiode detectors are generally employed to sample scattered radiation. Typically, they have an accuracy of about ±10%.

U.S. Pat. Nos. 3,344,703, 3,464,267, 3,535,523, 3,575,048, 3,687,558, 4,019,381, 4,035,088, 4,037,470, 4,130,363, 4,187,026, 4,321,824, 4,381,148, 4,413,916, 4,431,306, 4,522,511, 4,596,461, 4,728,188, 4,737,643, 4,765,749, 4,797,555, 4,828,384 and 4,842,404 describe various devices for measuring radiation.

SUMMARY OF THE INVENTION

The present invention seeks to provide apparatus capable of accurately measuring the energy of individual pulses of rapidly pulsing radiation.

There is provided, therefore, in accordance with an embodiment of the invention, apparatus for determining the energy of single pulses of rapidly pulsing laser radiation including first radiation sensing apparatus for providing a first signal output in response to single pulses of a plurality of pulses of rapidly pulsing radiation; second radiation sensing apparatus for providing a second signal output in response to a plurality of pulses of rapidly pulsing radiation, the second signal output being an indication of the overall average incident optical power of the plurality of pulses; and signal processing apparatus, associated with the first and second radiation sensing apparatus, for receiving and processing the first and second signal outputs so as to determine an average pulse rate of the plurality of pulses and thereby also to provide an output indication of the energy of single pulses of the plurality of pulses of rapidly pulsing radiation.

Additionally in accordance with an embodiment of the invention, the first sensing apparatus includes apparatus for sensing a portion of the optical energy of single pulses and the first output signal is an indication of the sensed energy.

Further in accordance with an embodiment of the invention, the second radiation sensing apparatus includes heat sensing apparatus and the second signal output is an indication of the heating effect of at least a predetermined portion of the overall average incident optical power of the plurality of pulses.

According to an additional embodiment of the invention, there is provided a method of determining the energy of single pulses of rapidly pulsing laser radiation including the steps of sensing a portion of the optical energy of single pulses of a plurality of pulses of rapidly pulsing radiation and providing a first output signal corresponding to the energy of each the sensed portions; sensing a portion of the overall average optical power of the plurality of pulses and providing a second output signal corresponding to the average optical power of the sensed plurality of pulses; and providing an output indication of the energy of single pulses of the plurality of pulses of rapidly pulsing radiation in response to the first and second signals.

BRIEF DESCRIPTION OF THE DRAWINGS

The present invention will be understood and appreciated more fully from the following detailed description, taken in conjunction with the drawings, in which:

FIG. 4 is a diagram of the electronic circuitry of signal processing circuitry shown in the block diagram of FIG. 3.

DETAILED DESCRIPTION OF THE INVENTION

Figure 1A:
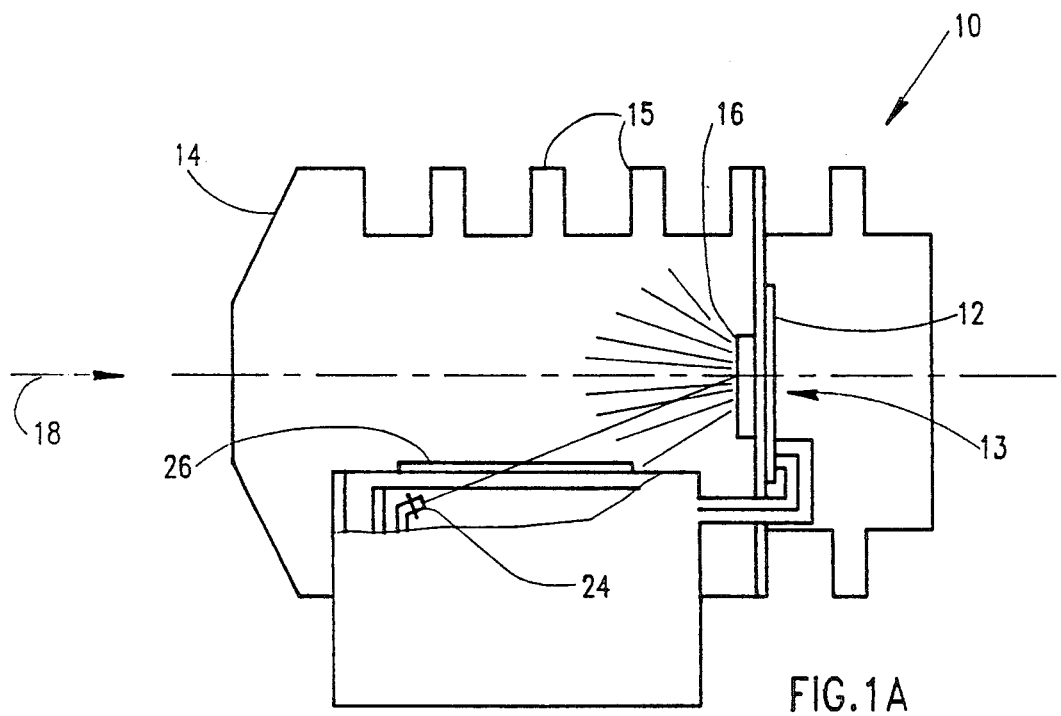
FIG. 1A is a schematic illustration of a detector head forming part of apparatus for measuring rapidly pulsing radiation, constructed and operative in accordance with a preferred embodiment of the present invention.

The present invention, as shown and described hereinbelow in conjunction with FIGS. 1A-4, may be used for accurately determining the energy of individual pulses of a rapidly pulsing radiation source, at a rate of up to at least 500 pulses per second. This is facilitated by determining the following quantities:

A. the voltage '$V_i$' corresponding to a portion of the incident energy of a single radiation pulse whose energy is to be determined;

B. the average voltage '$V_{av}$' corresponding to the average of portions of the incident energy of 'nearby' pulses (i.e. pulses before and/or after the individual pulse whose energy is to be determined);

C. the overall average power 'P' of the pulsed radiation over a time period in time proximity (e.g. 1 second) to or during which the single pulse occurs; and D. the pulse repetition rate 'f'.

The voltage $V_i$ corresponding to the energy of a portion of a single pulse is obtained by use of a photodetector, which provides an indication of the time rate change of incident optical power and which has a sufficiently rapid response time to be able to distinguish the pulse shape of different pulses of radiation. More precisely, the photodetector generates a current corresponding to the time variation in the incident optical power and this is converted into voltage $V_i$ which corresponds to the energy of the single pulse. The voltage $V_i$ is converted into a digital signal.

Alternatively, a pyroelectric detector, e.g., loaded with a capacitor, may be used to provide the voltage $V_i$, which corresponds to the total energy of a portion of a single pulse. In this embodiment, the pyroelectric detector may have a response time as fast as 2 msec.

According to yet a further embodiment, the pyroelectric detector is loaded with a resistor, typically of about 50 ohms, so as to sense the time variation of the pulse with a response time of as fast as 2 nsec.

The average voltage $V_{av}$ is determined by storing the plurality of signals, each of which corresponds to a voltage generated by a portion of the incident energy of each pulse and evaluating an average signal value.

The overall average power P of the pulsed radiation is obtained by providing an additional detector, typically a heat sensor, which is operative to absorb a known proportion, e.g. about 95%, of the pulsed radiation directed thereat. The heat sensor, which is preferably a thermopile, has a slow response time, for example, 1 second. The heat sensor thus cannot distinguish between individual radiation pulses but instead provides an output proportional to the heating effect of the overall incident average optical power of a plurality of radiation pulses.

Finally, the pulse repetition rate f is obtained by observing, via a signal processor, the average rate at which the radiation pulses are provided.

Once the four above-listed quantities are known, they may be used to determine the energy of individual pulses of rapidly pulsing radiation by use of the following equation:

$$\text{PULSE ENERGY } (e_i) = (V_i/V_{av}) \times (P/f).$$

With particular reference to the drawings, the present invention is now described in detail.

Referring now to FIG. 1A, there is shown a detector head, referenced generally 10, which forms part of apparatus for measuring the energy of individual pulses of rapidly pulsing radiation. The radiation is typically, although not necessarily, in the form of laser pulses provided from virtually any rapidly pulsing laser source (not shown), for example, a pulsed YaG laser, typically emitting radiation at a wavelength of about 1.06 um; an excimer laser, emitting radiation in the ultraviolet range, typically having a wavelength in the range 0.19−0.35 um; or a diode laser, emitting radiation having a wavelength typically in the range 0.67−0.85 um.

The detector head 10 includes a heat sensor 12 mounted in a heat dissipating head 14 having a plurality of cooling fins 15 and which may be of conventional construction. The heat sensor 12 is typically a thermopile sensor disc, for example, a 30A-P absorber disc sensitive to radiation in the visible range, or a 100A-EX absorber disc sensitive to radiation in the ultraviolet range. Both the 30A-P and the 100A-EX absorber discs are manufactured by Ophir Optics Ltd., P.O. Box 16042, Jerusalem, Israel. The heat sensor 12 may also have a volume absorber 16, such as known in the art.

There may also be provided a heating resistor 11 (FIG. 2) on the reverse side 13 of the heat sensor 12. The heating resistor can be used to electrically heat the heat sensor 12 so as to permit absolute power calibration by electrical substitution, as known in the art. Therefore, although not all of the radiation incident on heat sensor 12 is absorbed to provide a power reading, the actual power reading may be transformed into an overall power reading by calibration of the system prior to use and, thereafter, periodically.

Typical heating resistors useful in the present invention are models 30A-P-CAL (useful with the 30A-P absorber disc) and 100A-EX-CAL (useful with the 100A-EX absorber disc), both manufactured by Ophir Optics Ltd., Israel.

Rapidly pulsing laser radiation is directed towards the detector head 10 in the direction indicated by arrow 18, so as to impinge on the heat sensor 12. In the present example, the heat sensor 12 absorbs approximately 95% of the incident optical power, and provides a voltage output which corresponds to the heating effect thereof. This voltage output is provided to a microprocessor 20 (FIG. 3) at intervals which correspond to the response time of the heat sensor. This voltage output is stored by a memory associated with the microprocessor in predetermined signal form. The response time of a typical thermopile, for example, is approximately 1 second.

The microprocessor is operative to provide an overall average power reading P which corresponds to the voltage output from the heat sensor 12. Power reading P may be displayed on a display 22 (FIG. 3) associated with the microprocessor.

In the example of FIG. 1A, the remaining approximately 5% of the radiation incident on the heat sensor 12 is reflected diffusely therefrom. As illustrated schematically in FIG. 1A, a portion of the reflected radiation impinges on a fast response radiation detector 24.

Figure 1B:
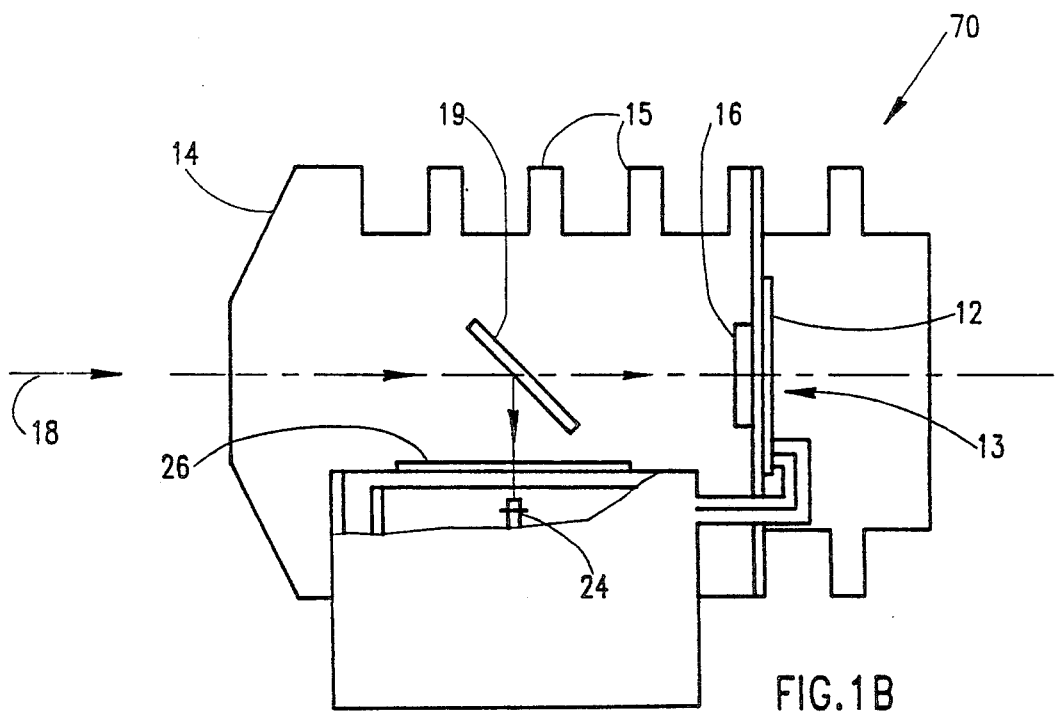
FIG. 1B is a schematic illustration of a detector head constructed according to an alternative embodiment of the present invention.

Referring now briefly to FIG. 1B, there is shown a detector head 70, constructed according to an alternative embodiment of the invention. Except as specifically stated herein, detector head 70 is similar to head 10 (FIG. 1A) and similar components thus bear similar reference numerals.

As illustrated, detector head 70 employs a beamsplitter element 19 disposed along an optical axis between the laser source (not shown) and the heat sensor 12. Fast detector 24, which may be either a PIN photodiode or a pyroelectric detector is arranged so as to receive a portion of the radiation reflected from the beamsplitter 19. Typically, 95% of the radiation is transmitted to heat sensor 12 and the remaining 5% is reflected towards fast detector 24.

Referring now to both FIGS. 1A and 1B, fast detector 24, which may have a response time as rapid as about 1 nsec, is operative to provide an indication corresponding to the time rate change in the incident optical power. As the detector has a fast response time, it is operative to provide output indications for each individual radiation pulse.

Fast detector 24, which is preferably a photodiode, may be a PIN diode, such as an S 2216-02 PIN diode, which is sensitive to radiation in the visible range; or an S 1722-02 PIN diode, which is sensitive to radiation in the non-visible range. Both the S 2216-02 and the 1722-02 PIN diodes are manufactured by Hamamatsu Photonics K.K., of 1126 Ichino-Cho, Hamamatsu City, 435, Japan.

In the present example, a neutral density filter 26 is arranged across the fast detector 24 so as to transmit thereto only a small fraction of the scattered radiation and thus prevent saturation thereof, which may occur at about 1 mW.

It will be appreciated by persons skilled in the art that, as the quantity $V_i/V_{av}$ is a dimensionless number derived by sensing, via fast detector 24, radiation reflected from volume absorber 16 and passing through the neutral density filter, the precise accuracy of the neutral density filter and the precise amount of radiation reflected from absorber 16 do not affect the accuracy of the calculated quantity $e_i$.

Figure 2:
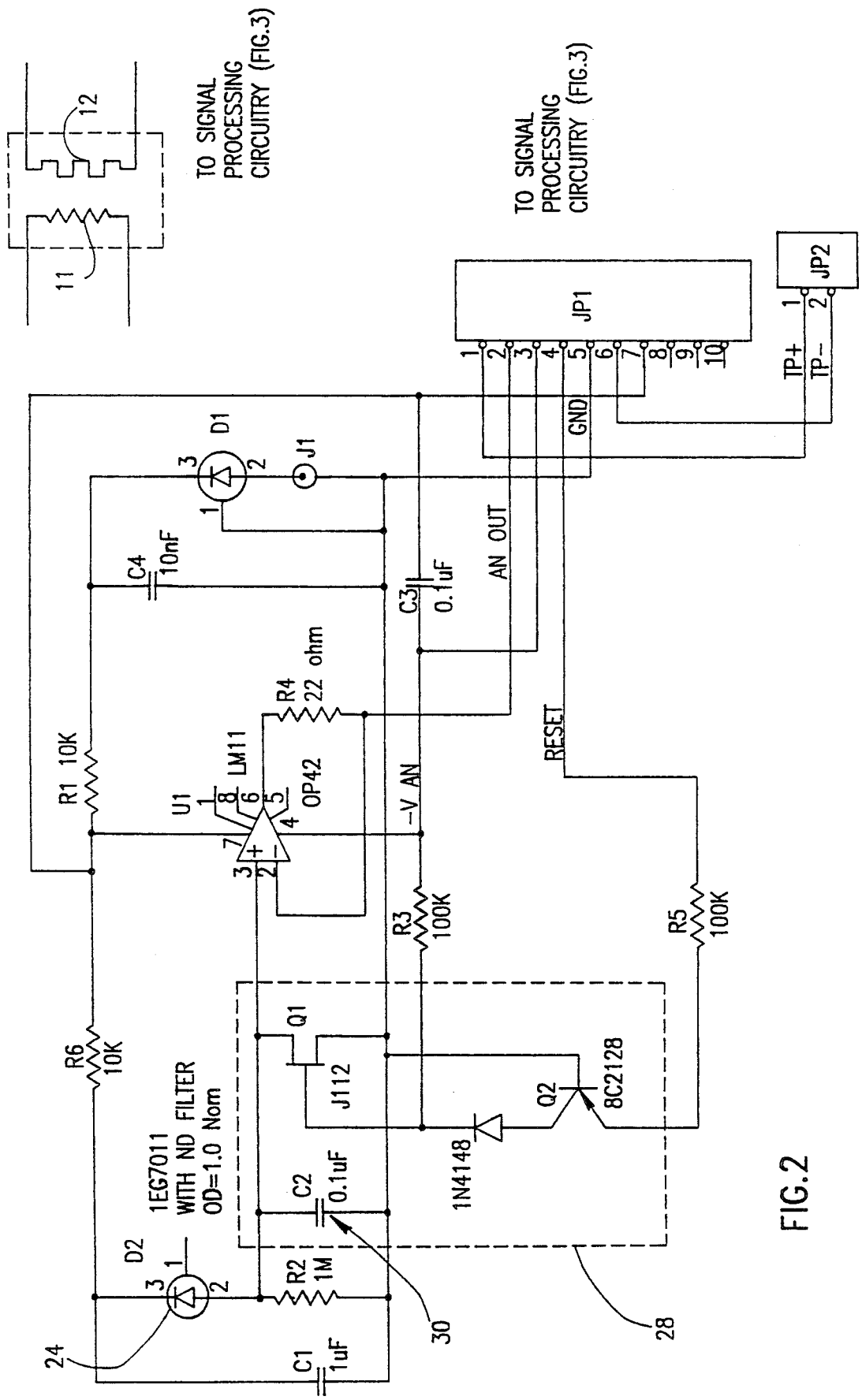
FIG. 2 is a diagram of exemplary electronic circuitry of the detector head illustrated in FIGS. 1A and 1B.
Figure 3:
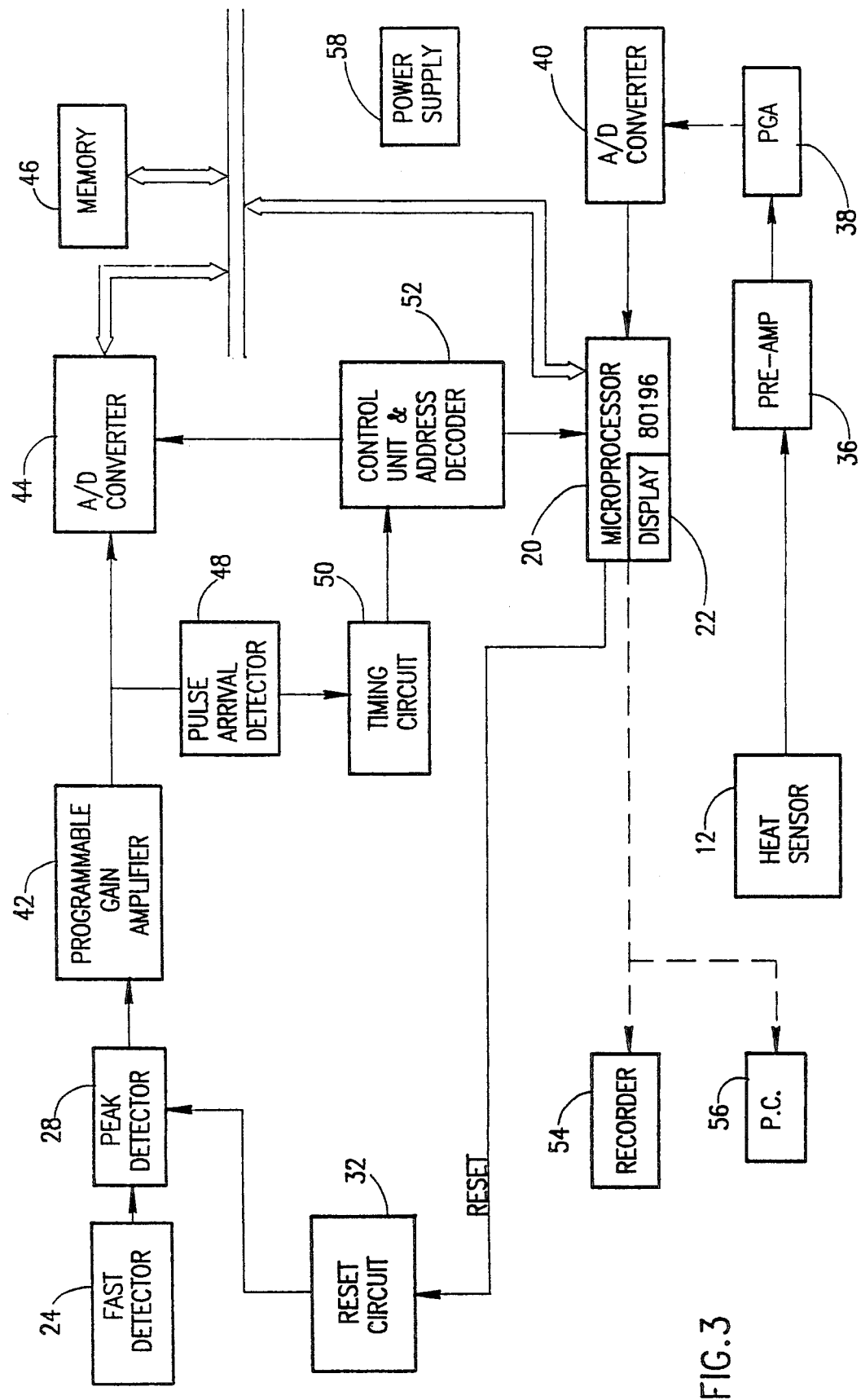
FIG. 3 is a block diagram representation of the apparatus of the present invention, including the detector head thereof and associated signal processing circuitry.

Referring now also to FIG. 2, an output current is provided by the fast detector 24 corresponding to the time rate change in incident optical power of each pulse of radiation. The output from the fast detector is provided to the processing circuitry indicated in FIGS. 3 and 4, via a peak detector circuit 28 (FIGS. 3 and 4). In the exemplary circuit illustrated in FIG. 2, there is provided a capacitor 30 which experiences a voltage rise proportional to the current provided from the fast detector 24. The peak voltage corresponds to the optical energy of each radiation pulse. Once the peak voltage has been sampled by the signal processing circuitry (FIGS. 3 and 4), a reset circuit 32 (FIG. 3) is operative to discharge the holding capacitor C22 (FIG. 4) in peak detector 28 in response to an appropriate signal as described below.

As described above, according to an alternative embodiment of the invention, the photodiode 24 is replaced by a pyroelectric detector which may have resistive loading so as to have a response time as fast as 2 nsec. Alternatively, the pyroelectric detector may be capacitively loaded so as to provide a voltage corresponding to the total pulse energy. A typical pyroelectric detector suitable for use in the invention is pyroelectric detector model 420, manufactured by Eltec Instruments Inc., Box 9610, Daytona Beach, Fla., U.S.A.

According to an alternative embodiment of the invention, the illustrated, peak detector circuit may be replaced, for example, by a sample and hold circuit.

Referring now to FIG. 3, output signals from the heat sensor 12 are passed to microprocessor 20 via signal processing circuitry, which includes a suitable preamplifier 36, a programmable gain amplifier 38 and an analog to digital converter 40.

Referring now also to FIG. 4, output signals from the fast detector 24 are provided, as indicated at 34, to a programmable gain amplifier 42 forming part of the illustrated signal processing circuitry. It will be appreciated that the provision of the programmable gain amplifiers 38 (FIG. 3) and 42 permits selection of a range over which the energy of the laser pulses may be measured. The output from the programmable gain amplifier 42, which corresponds to the voltage $V_i$ corresponding to a portion of the incident optical power of an individual radiation pulse, is provided, in the form of a first signal, to an analog to digital converter 44 from where it is provided both to microprocessor 20 (FIG. 3) and to an appropriate memory unit 46 associated therewith. The microprocessor is operative to determine the average voltage corresponding to the time rate change of portions of incident optical power of nearby pulses, $V_{av}$, as defined with respect to the equation brought above.

The output from the programmable gain amplifier is also sensed by a pulse arrival detector 48 which provides an output to a timing circuit 50 and from there to a control unit and address decoder 52. In response to the signal received by the control unit and address decoder 52, the microprocessor is operative to provide a signal, via the control unit and address decoder 52, to the reset circuit 32, so as to discharge the capacitor C22 in the peak detector 28 (FIG. 4), as described above. A typical microprocessor 20 is an 80196 microprocessor manufactured by Intel Corporation, U.S.A. The microprocessor is operative to determine the energy $e_i$ of a radiation pulse by use of the equation brought above.

The radiation pulse energy may be provided as output data either in the form of an analog voltage proportional to the pulse energy, such as may be required for driving a chart recorder 54 (FIG. 3); or in the form of digital data sent via an RS 232 serial link to a personal computer 56 (FIG. 3).

It will be appreciated by persons skilled in the art that the circuitry shown and described above in conjunction with FIGS. 2, 3 and 4 requires certain modifications when fast detector 24 is a pyroelectric detector.

It will be appreciated by persons skilled in the art that the scope of the present invention is not limited to what has been particularly shown and described hereinabove. The scope of the present invention is limited, rather, solely by the claims, which follow.

We claim:

1. Apparatus for determining the energy of single pulses of rapidly pulsing laser radiation comprising:
   first radiation sensing means for providing a first signal output $V_i$ in response to single pulses of a plurality of pulses of rapidly pulsing radiation;
   second radiation sensing means for providing a second signal output P in response to a plurality of pulses of rapidly pulsing radiation, said second signal output P being an indication of the overall average incident optical power of the plurality of pulses; and
   signal processing means, associated with said first and second radiation sensing means, for receiving and processing said first and second signal outputs for storing the output of said first radiation sensing means to provide an average signal value $V_{av}$ and so as to determine an average pulse f of said plurality of pulses and thereby also to provide an output indication $e_i$ of the energy of single pulses of the plurality of pulses of rapidly pulsing radiation in accordance with the following functional relationship:

$$e_i = (V_i / V_{av}) \times (P/f).$$

2. Apparatus according to claim 1, and wherein said first sensing means comprises means for sensing the time rate change of a portion of the optical power of single pulses and said first output signal is an indication of said sensed change.

3. Apparatus according to claim 2, and wherein said first radiation sensing means comprises fast response radiation detection means.

4. Apparatus according to claim 3, and wherein said fast response radiation detection means is operable to provide said first signal output in response to each single pulse of a plurality of pulses of radiation pulsing at a rate of up to at least 500 pulses per second.

5. Apparatus according to claim 2, and wherein said first radiation sensing means comprises photodetector means.

6. Apparatus according to claim 5, and wherein said photodetector means comprises PIN photodiode means.

7. Apparatus according to claim 2, and wherein said first radiation sensing means comprises pyroelectric sensing means.

8. Apparatus according to claim 2, and wherein said signal processing means comprises:
   means for storing each said first signal;
   means for storing said second signal;

means for averaging the sensed time rate change of the sensed portion of optical power of each single pulse of said plurality of pulses and for storing said average in the form of a third signal;

means for determining the average pulse rate of said single pulses and for storing said rate in the form of a fourth signal; and means for providing an output indication of the energy of a selected single pulse of rapidly pulsing laser radiation in response to said first, second, third and fourth signals.

9. Apparatus according to calim 1, and wherein said first sensing means comprises means for sensing a portion of the optical energy of single pulses and said first signal output is an indication of said sensed portion of energy.

10. Apparatus according to claim 9, and wherein said first sensing means comprises capacitively loaded pyroelectric means.

11. Apparatus according to claim 1, and wherein said second radiation sensing means comprises heat sensing means and said second signal output is an indication of the heating effect of the overall average incident optical power of the plurality of pulses.

12. Apparatus according to claim 11, and wherein said heat sensing means comprises thermopile means.

13. Apparatus according to claim 12, and also including means for calibrating said heat sensing means.

14. Apparatus according to claim 13, and wherein said means for calibrating comprises selectably operable electrical resistor means for heating said heat sensing means.

15. Apparatus according to claim 1, and also comprising means for directing a first predetermined portion of the pulses of rapidly pulsing radiation towards said first radiation sensing means and a second predetermined portion of the pulses of rapidly pulsing radiation towards said second radiation sensing means.

16. A method of determining the energy of single pulses of rapidly pulsing laser radiation comprising the following steps:

sensing a portion of the variation over time of the optical power of single pulses of a plurality of pulses of rapidly pulsing radiation and providing a first output signal $V_i$ corresponding to the energy of each said sensed portion;

sensing a portion of the overall average optical power of the plurality of pulses and providing a second signal output P corresponding to the average optical power of the plurality of pulses.

storing the output of said first radiation sensing means to provide an average signal value $V_{av}$;

determining an average pulse rate f of said plurality of pulses; and providing an output indication $e_i$ of the energy of single pulses of the plurality of pulses of rapidly pulsing radiation in response to said first and second signals in accordance with the following functional relationship:

$$e_i = (V_i / V_{av}) \times (P/f).$$

17. A method according to claim 6, and wherein said step of sensing and providing a first output signal comprises the steps of sensing the change with time of the portion of the incident optical power of each pulse and providing a signal corresponding to the energy of each pulse of a plurality of pulses pulsing at a rate of up to at least 500 pulses per second.

18. A method according to claim 17, and also including the following steps:

storing each said first signal;

averaging the sensed time rate change of the sensed portion of the incident optical power of each single pulse and storing said average in the form of a third signal;

determining the average pules rate of said single pulses and storing said rate in the form of a fourth signal; and storing said second signal, said step of processing including the step of providing an output indication of the energy of a selected single pulse of rapidly pulsing laser radiation in response to said first, second, third and fourth signals.

19. A method according to claim 16, and wherein said step of sensing and providing a first signal comprises the step of sensing and providing said first output signal in response to each single pulse of a plurality of pulses of radiation pulsing at a rate of up to at least 500 pulses per second.

20. A method according to claim 16, and wherein said step of sensing and providing a second output signal comprises the step of sensing the heating effect of a portion of the overall average incident optical power of the plurality of pulses.

* * * * *